Sept. 5, 1933.  E. SANTONI  1,925,207
PHOTOGRAMMETRIC APPARATUS
Filed Feb. 28, 1929   3 Sheets-Sheet 1
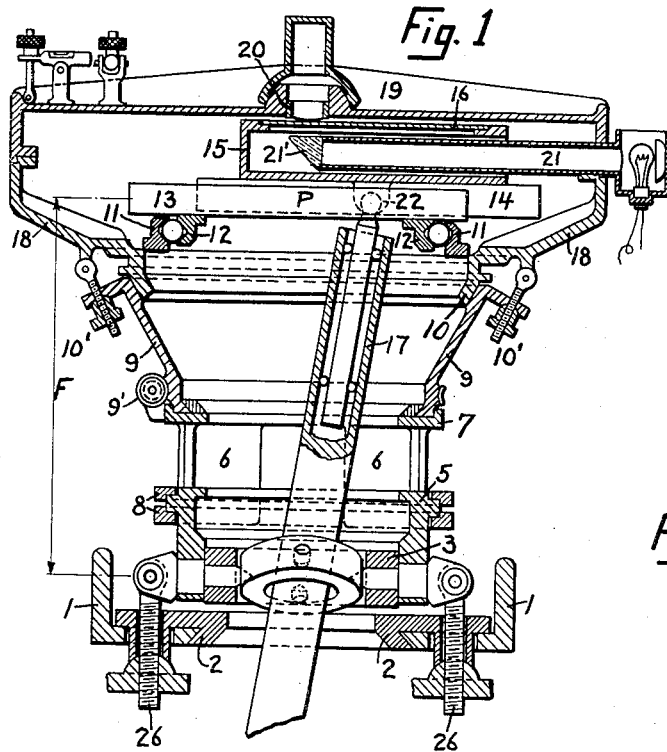
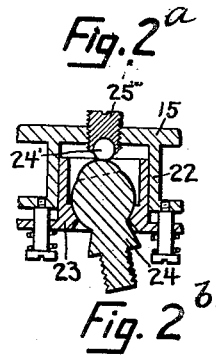
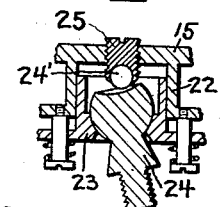
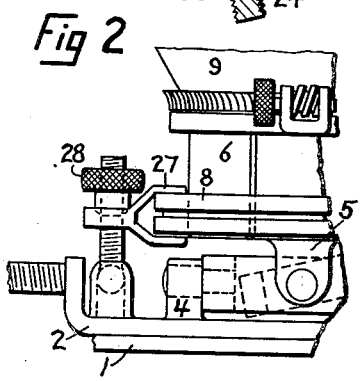
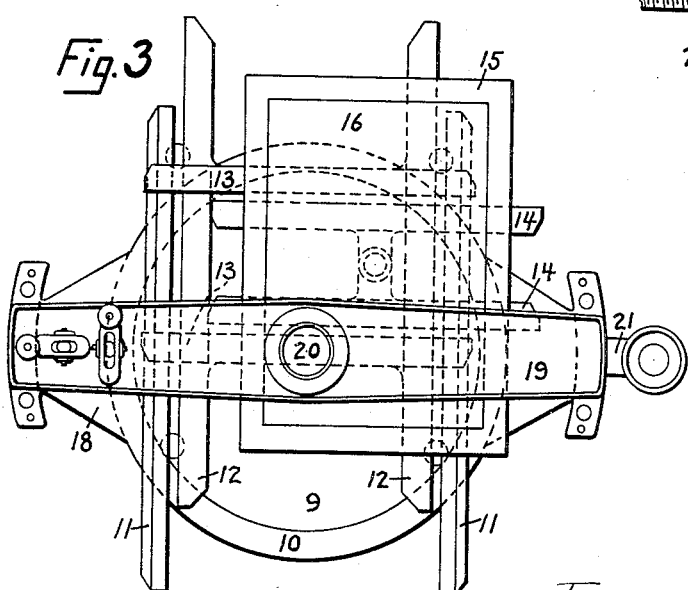
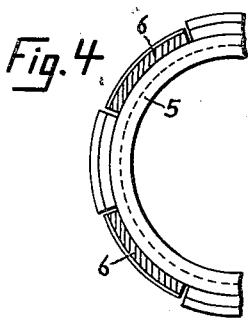
INVENTOR.
Ermenegildo Santoni
BY
ATTORNEY.

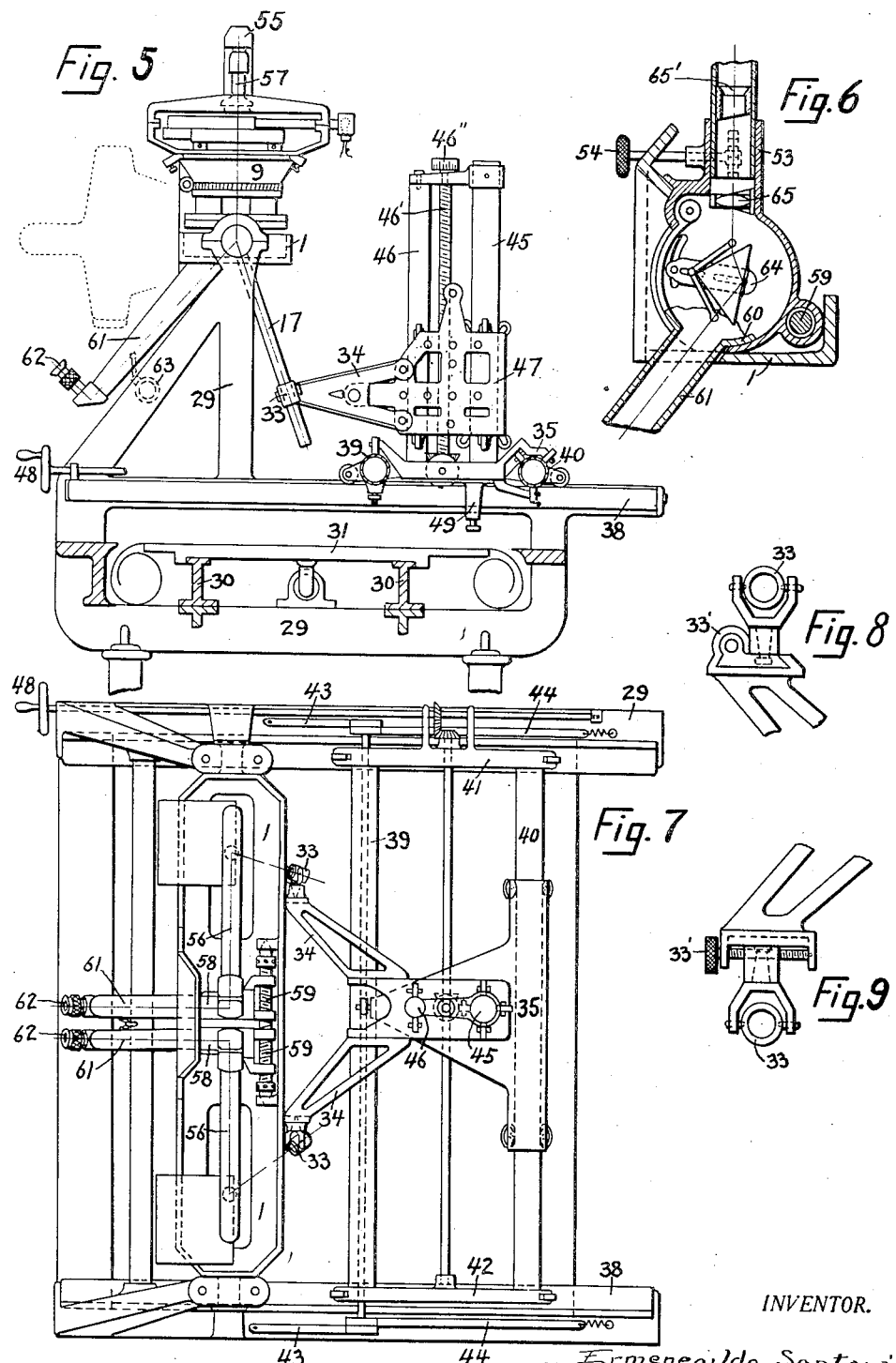

Sept. 5, 1933.                E. SANTONI                1,925,207
                       PHOTOGRAMMETRIC APPARATUS
                          Filed Feb. 28, 1929              3 Sheets-Sheet 3
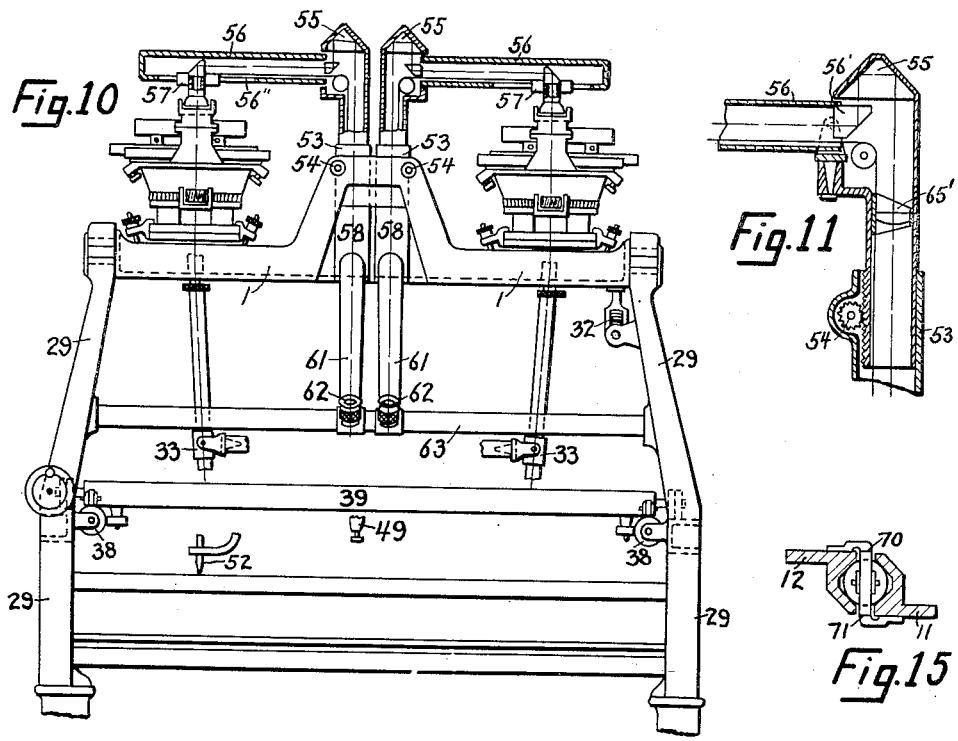
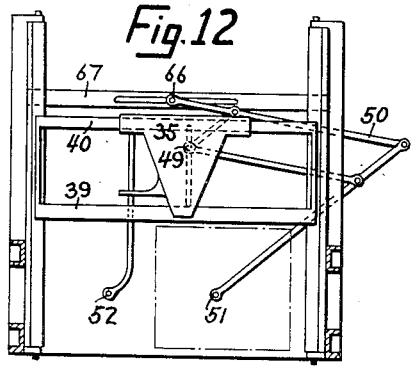
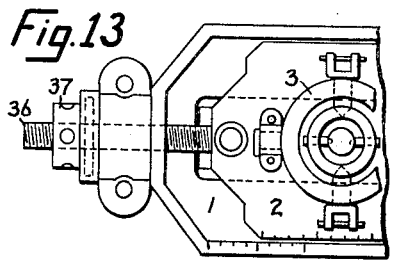
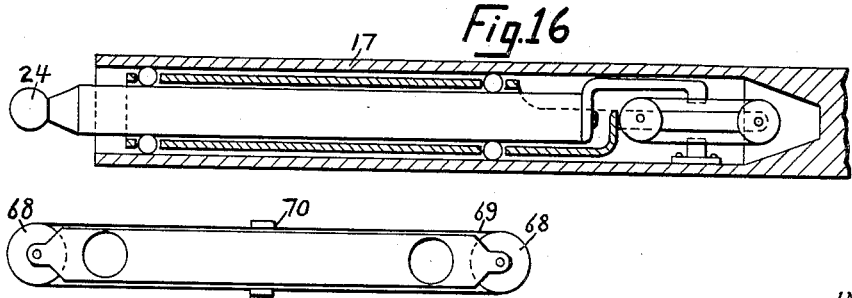
INVENTOR.
Ermenegildo Santoni
BY
ATTORNEY.

Patented Sept. 5, 1933

1,925,207

UNITED STATES PATENT OFFICE 1,925,207

PHOTOGRAMMETRIC APPARATUS

Ermenegildo Santoni, Florence, Italy

Application February 28, 1929, Serial No. 343,320, and in Italy February 29, 1928

23 Claims. (Cl. 33—20)

The object of the invention is an apparatus by means of which photographs made with any photographic apparatus and taken from either above or on the ground may be utilized to obtain topographic drawings, without the necessity of using an objective identical with the objective used for taking the photograph, while assuring a compensation of the effects of distortion. This purpose is realized, according to the invention, by a photoplate carrier device comprising a frame carrying the plate and adapted to be shifted in a plane according to a system of orthogonal directions, so that each point of the plate may be brought in registration with the collimator system. The shifting movement of the carrier is caused by the polar movement of a bar which is pivoted by means of a universal joint in a point which represents the view point. The connection between the the bar and the carrier consists of a spindle slidable inside the bar and connected to the carrier by means of a spherical joint, the sphere of which is shaped so that when the focal distance of the instrument varies according to the inclination of the bar, the distortion errors of the objective are corrected. The axis of the bar will thus coincide with the visual direction of the photographic detail collimated on the plate. By using two photogoniometric devices as above described it is possible to obtain the planimetric drawings.

In order to permit the use of photos taken from above or on the ground, the said two devices are mounted on a transverse rod which may be rotated through an angle of 90°. The apparatus is provided with a binocular system for stereoscopic observations, is provided with a knee joint constructed to maintain the oculars stationary while the plate carriers are being shifted, and is also provided with an arrangement for adjusting the two oculars to the interpupilary distance of the observer.

The tracing carriage is connected to either of the described oscillating bars by means of movable arms, in order to utilize a greater range for the construction of the model. The horizontal control of the tracing carriage is obtained by a pantograph provided with a device for releasing the fulcrums of the pantograph so that they may slide along orthogonal guides, for the purpose of permitting a complete course of the carriage with any ratio or scale of reduction and within a range of movement within the normal limits permitted to the arm of the operator.

A constructional form of the new apparatus will be described by way of example with reference to the accompanying drawings in which:

Fig. 1 is a section of one of the devices adapted to carry the photograph to be utilized (diapositive);

Fig. 2 is a partial side view of the same device and a section on a larger scale of the spherical joint controlling the movements of the plate while Figures 2a and 2b are used similar to Fig. 2, but showing a modified construction of the spherical joint for correcting the effects of distortion and for connecting the bar to the carrier;

Fig. 3 is a plan view of Fig. 1 and

Fig. 4 is a detail horizontal section of Fig. 1;

Fig. 5 is a side view of the complete apparatus;

Fig. 6 is a section of a detail of the knee joint between the tubes for the stereoscopic observation, to maintain the oculars stationary during the movement of the plate carriers;

Fig. 7 is a plan view of Fig. 5;

Figs. 8 and 9 show details of the connection between the oscillating bars and the arms of the tracing carriage;

Fig. 10 is a front view of the complete apparatus;

Fig. 11 shows another detail of the tubes for the stereoscopic observation;

Fig. 12 shows a detail on a smaller scale of the pantographic system;

Fig. 13 shows a detail of the mounting of the centre of oscillation of the oscillating bars, Figs. 14 and 15 show respectively a front and a side view of a device for holding in place the spheres of the plate carrier guides, Fig. 16 shows a detail of the oscillating bar.

The apparatus is based essentially on the use of a special device (Figs. 1, 2, 3, 4) in which the photograph (diapositive) to be used can be inserted. In this device the photo can be shifted in a plane in front of a collimator with which any point of the diapositive which has been placed in position may be observed. The movement in the plane is transmitted to the plate by a bar which is mounted on a universal joint and which may be made to follow the direction of the visual relating to the point momentarily observed. The above described result is obtained in the following way.

The mounting 1 of the apparatus for each photographic plate (diapositive) shown in Figs. 1 and 2 is provided with a slot along which the sliding frame 2 is adapted to slide. A ring 3 (Fig. 13) carries four pins at angles of 90°. Two diametrically opposed pins are seated in the bearings 4 (Fig. 2) fixed to the sliding frame 2, while the other two pins act as a fulcrum for the bearings of the ring 5. This ring 5 (Figs. 1 and 4) carries four segments which project exteriorly, and in the spaces between these segments four externally threaded segments 6 are adapted to slide vertically. These segments 6 are fixed at their upper part to the ring 7. Two threaded rings 8 are screwed into these segments and embrace the projections of the ring 5. By properly maneuvering the rings 8 it is possible to lift or lower the upper part of the device in its entirety relative to the ring 5. This movement varies the distance F to adjust it in correspondence with the focal distance of the objective used for making the exposure.

The ring 7 sustains the lower part of the conical piece 9 which at its upper portion provides on its inner periphery a seat formed on the surface of a sphere. In this seat rests the ring 10 which is held against the seat 9 by means of four micrometer screws and nuts 10' arranged along two diameters at right angles. By maneuvering these nuts it is possible to incline the plane of the ring 10 with respect to the axis of the cone 9. This inclination serves to compensate for the possible defects or errors in the perpendicular relation between the plane of the plate and the optical axis in the camera. The center of the spherical seat of the oscillating ring 10 corresponds to the intersection P of the axis of the cone 9 with the focal plane of the device.

Secured to the ring 10 (Fig. 3) are two guides 11, grooved internally so that spheres may run longitudinally along them. Two other guides 12 similar to the guides 11 are placed in front of these latter and are also in contact with the said spheres. The guides 12 are connected to similar guides 13 which are arranged at an angle of 90° respecting the guides 12 and between which two other guides 14, also in contact with spheres, may be shifted. The guides 14 are secured to a box 15, which in an opening provided receives in its upper part the diapositive with the gelatine turned upwards. Screws (not shown in the drawings) allow slight adjustments of the plate in its plane, to cause suitable marks on the box to register with the photographic impressions of corresponding marks existing in the camera in which the photo was exposed.

Below the box 15 and more precisely in the point of intersection, between the vertical line passing through the center of the diapositive and the focal plane of the device, there is provided a spherical connection 22 between the box 15 and a spindle which may slide without any side play while in contact with spheres inside the bar 17. This bar 17 is pivoted by a universal joint at its lower end whereby it can oscillate around a point corresponding to the intersection of the axis of the four pins of the ring 3. The ring 10 is provided with two brackets 18 which support the beam 19 which in a point corresponding to the axis of the cone 9 is provided with a hole within which a ring 20 is adapted to slide with a slight friction. This ring 20 carries a small lens having cross lines marked on its lower side. Two small springs are also provided to ensure a light pressure between the lens and the plane of the diapositive.

The beam 19 holds a tube 21 which passes through a small slot provided in the box 15 and carries a small prism 21' which receives light from a small lamp arranged at the other end of the said tube.

If an oscillating movement is imparted to the bar 17, such movement is transmitted through the sliding upper spindle and causes the shifting movement of the box 15, and thus any point on the plate may be adjusted to correspond to the collimation cross lines on the lens in ring 20.

The device shows clearly that the axis of the bar takes up successively the direction of vision which, in the camera in which the photograph was originally taken, comes from the object point and formed the impression point on the photo plate which is being observed in a particular moment. This is true in case the objective in the camera is without distortion.

When using an objective which is conducive to distortion errors, a special arrangement of the spherical joint between the box 15 and the sliding spindle serves to compensate automatically for these errors. This arrangement is shown on a larger scale in the two forms illustrated in Figs. 2$^a$ and 2$^b$. The box 15 has secured to it the member 22 which contains the small sliding cylinder 23 which by means of suitable springs holds the sphere 24 against the small sphere 24' which is held by the screw 25. The sphere 24 does not follow the normal curvature in its upper calotte, but has a recess with a special curvature. Starting from the central position (bar 17 perpendicular to the plane of movement of the plate) and shifting towards the periphery, the center of the sphere 24 is caused to be lowered and to describe a curve instead of a straight line. Consequently the shifting of the plate is a function of the angle through which the rod 17 rotates, and of a distance which is no longer constant (F), but which decreases. It is therefore evident that by calculating the curvature of the recess of the sphere 24 for a given objective affected by a convex distortion, the lowering of the centre of the sphere 24 causes a greater inclination which compensates for the distortion. In an objective which is affected by a concave distortion, since the bar 17 in such case must have a smaller inclination towards the periphery than the inclination which would be obtained without the correction device, it will be necessary to lift the center of the sphere 24, which result may be obtained by providing the upper part of the sphere with an additional convex curvature instead of with a recess.

From the foregoing it is clear that the apparatus above described permits the use of any photographs obtained with any kind of objectives (of course within the limits of the mechanical variation of the focal distance), provided only that the measure of the distortion curve be known so as to shape the small sphere 24 in accordance therewith and which sphere may be easily interchanged. In order to adjust the plate to suit the external orientation, the pins of one of the diametrically opposed sets of pins on the ring 3 (Fig. 1) carry the pivoted joints for the screws 26 with the respective operating nuts which permit an inclination of the whole apparatus around the axis of the other set of pins resting in the bearings 4. In order to obtain the inclination in the orthogonal direction, two clamps 27 (Fig. 2) are connected to the ring 5 and are provided with the nuts of two screws 28 which are pivoted to the sliding frame.

The mounting 1 which forms a part of the apparatus carries two of the devices above described (Figs. 5, 7 and 10).

The apparatus (Figs. 5, 7, 10) is constructed with two symmetrical frameworks 29 (side pieces) which are interconnected by the small beams 30 (Fig. 5) which serve also as a support for the small table 31, on which is laid a sheet of drawing paper on which a pencil draws the planimetry and the level curves obtained from the photographs.

The mounting 1 has at its ends two journals which seat in suitable bearings fitted on the frameworks 29. A worm which acts on a worm segment 32 (Fig. 10) may rotate the piece 1 around these journals until the two plate carriers reach the position shown in dotted lines in Fig. 5; consequently the plates can be made to take up any desired position with respect to the plane of representation (plane of the drawing paper), in accordance with the inclination of the photographs taken from above or on ground. The bars 17 are prolonged downwardly and pass with slight friction through the rings 33, which are pivoted by universal joint to the arms 34 of the carriage 35.

In order to simplify the drawings, Fig. 7 merely schematically indicates the system of the plate carrier by means of the plate and the axis of the bar 17, while in Fig. 10 the tracing carriage is not shown, merely the ends of the arms, the pencil carrier and the controlling pin belonging to it being illustrated.

The distance between the centres of the joints 33 is fixed while the distances between the centres of oscillation of the two bars 17 is variable and the difference between these two distances must represent the stereoscopic base of the two photographs that are being used, in the scale of the drawing to be prepared.

The transverse shifting of the plate-carrier device is accomplished by means of the device shown in Fig. 13. The sliding frame 2 is connected to the screw 36 which passes through the bearing collar, and the ring 37 screwed thereon is held in a fixed position against the collar so as to cause the shifting of the said frame 2 along the slot of the mounting 1. A scale is provided on the side of the mounting 1 and a vernier is applied to the plate 2. Tubes 38 which are straight on their exterior surface are fixed to the slide frameworks 29. Along these tubes a frame consisting of two tubes (39 and 40) is adapted to slide, which tubes are interconnected by transverse members 41, 42 fitted with small supporting and guide rollers for the said frame on the tubes 38.

The tube 39 contains a rotating shaft which carries at its ends two pulleys on either of which two thin steel bands are wound in opposite directions. While the bands 43 are secured at the ends directly to the side frames 29 by aid of pins, the bands 44 are secured to the frames 29 through the intermediary of springs which ensure their tension. This device permits the shifting of the frame 39, 40, 41, 42 without any undue displacements. The tube 40 serves to support and guide the bridge 35 which also bears on the tube 39 by means of a roller. The bridge 35 carries two vertical tubes 45 and 46 connected one to the other at their upper part and carrying a screw 46' with a micrometer drum 46'' which controls the shifting in the vertical direction of the slide 47 to which are attached the arms 34. The screw for lifting the slide 47 is controlled from the hand wheel 48 (Fig. 7) by means of bevel gears and small transmission spindles with longitudinal grooves to receive keys. The bridge 35 extends downwardly and this prolongation carries a pin 49 which serves for the attachment of the pantograph 50 (shown in Fig. 12 on a smaller scale).

The operator, by working with the right hand the end 51 of the pantograph and using the left hand to adjust the hand wheel 48, can bring successively into correspondence with the two collimating cross lines of the plate carriers all the couples of the photo points corresponding to the same points of the photographed landscape, while he reads the respective quota on the micrometer drum 46'' and on the scale which belongs to the vertical screw, and a pencil 52 (carried by the same carriage 35) will draw the contour.

The contemporary view of the two collimating crosses is obtained with a special optical device which is constructed as follows. From the center of the mounting 1 two tubes 53 extending upwardly, which serve as a guide and a support to inner tubes which may be raised or lowered by a rack and pinion 54 (Figs. 6, 7, 10, 11). The inner tubes carry on their upper part two double reflecting prisms 55 and the bearings of two universal joints which sustain the ends of the horizontal tubes 56. These tubes carry pivoted to one of their ends a fixed total reflecting prism 56' and at their opposite end a slot 56'' which serves to guide a sliding tube 57 which carries on its upper part another total reflecting prism and rests with its lower part on a spherical seat in correspondence with the hole which encloses the ring 20 (Fig. 1).

The tubes 53 are carried by the cylindrical boxes 58 which rest on, and are guided by the screw 59 (Figs. 6 and 7) having exposed threads whereby, by maneuvring this screw by aid of a handle the tubes 53 are adjusted relative to each other, as the respective axes of the two tubes must be adjusted to the distance between the pupils of the operator's eye.

The boxes 58 carry in their interior the segments 60 which in turn carry the tubes 61, which are fitted at their ends with total reflecting prisms and eye-pieces 62. The tubes 61 are connected by means of a sliding pin and a small connecting rod to the tube 63 which is secured to the side framework 29 of the apparatus. During the rotation of the whole mechanism carried by the mounting 1 the box 58 rotates relatively to the segment 60 which remains stationary with the tube 61. In order that the images of the cross lines may reach the eye-pieces in any position of the devices, the prisms in the center of each box 58 (Fig. 6) must rotate through an angle which is one half of the angle of rotation of the whole mechanism. For this purpose, the prism is mounted on a plate 64 provided with two slots the inner one of which contains a small roller coaxial with the box 58, and the outer one contains another small roller carried by the connection between two connecting rods of equal length, one of which is connected at the other end to the box 58, while the other one is connected to the tube 61. Consequently, since the prism rotates according to the diagonal line of the articulated parallelogram the desired movement is brought about.

In order to assure that the refracted central ray always strikes the center of the reflecting surface of the prism, the latter is adapted, during its rotation, to execute a radial movement caused by the sliding movement of a pin fixed to the plate 64 in a suitable curved groove in the box 58. The image of the plate and of the cross lines above it, is carried onto the focal plane of the ocular by two objectives (Fig. 6), one of which 65 is fixed on the box 58 and the other 65' may slide inside the inner tube 53 (Fig. 6). The fixed objective 65 is placed at the main focal distance from the focal plane of the corresponding eye-piece. The parallel rays which reach this objective converge on the focal plane of the eye-piece. The other objective (65') is also placed at the main focal distance from the plane of the plate. The rays issuing from each point on the plate are parallel.

The distance between the two objectives may thus be varied without any risk of the image being defocused on the focal plane of the eye-piece.

The distance between the sliding objective 65' and the plate however must remain the same for any displacement of the prism 57 along the slot, such displacement being caused by the various inclinations which the two plate carriers may take when reproducing the external orientation of the photograph. This is obtained by connecting the prism 57 through a steel strip with the tube carrying the sliding objective, which strip passes over a small adjustable pulley (Fig. 11). This strip, which is extended downwardly is wound to a drum provided with an inside spring (not shown in figure) which ensures the movement in either direction. The cone 9 of the plate-carrying device may be rotated by means of a worm wheel and a worm 9'. The beams 19 of the said devices are interchangeable. They are provided on their upper part with two levels placed at an angle of 90° and having screws to adjust the levels to any position of the beams. When working with a continuous series of photographs, and when a couple of plates has been used and one plate must be passed on from one part of the apparatus to the other to use it with the following plate, it will be possible to adjust the two levels of the respective beam 19 and transfer this beam together with the plate to the other part of the apparatus. By then maneuvring the screws 26 and 28 of this apparatus it will be possible to re-adjust both levels and thus rapidly obtain the external orientation of the plate, even in the case that because of an uneven succession of the series of photographs, it becomes necessary to rotate the cone 9 in various ways.

The apparatus which has the object to utilize photographs taken on land or from aircrafts, ordinarily should have the tubes 38 and 46-45 much longer than has been shown in the figures, in view of the great range to cover with the joints 33. The reduced dimensions shown are rendered possible by the fact that the arms 34 (Fig. 5) are fixed to the slide 47 by means of three bolts which can be easily removed, and that the said arms may be fixed in other sets of three holes in a new position rearwardly of the former position (to the right in the figure) at a known distance; in addition they can be rotated through an angle of 90° (with the joints 33 turned upwardly) and be fixed in this new position, they may also be shifted upwardly to a selected distance and may be secured in such position. While the position of the arms shown in the drawing is suitable for the utilization of aerial photographs having their axes almost vertical, the other successive positions permit the utilization of plates produced with optical axes approaching more and more to the horizontal position and even up to the horizontal position itself, and may even surpass that position, as it may sometimes be necessary in land photogoniometry.

The joints 33 (Figs. 8 and 9) can be moved by means of sliding bearings fitted with micrometer screws 33', one in a direction parallel to the tubes 38 and the other in a direction parallel to the tubes 45-46. The first movement is necessary for land photogrammetry in case the photographs have not been taken with the axis in a normal position to the base, and for aerial photos in order to adjust the orientation between the stereoscopic base and the drawing paper. The second movement (vertical) is necessary in both cases in order to assign virtually to the two points of view (centers of movement of the bars) the differences of quota belonging to each point.

As shown in Fig. 12, in view of the range in which the right arm of the operator can move, the end 51 of the pantograph, and of the necessary ratio of reduction with the movement of the tracing carriage, the latter could be moved only within a space limited to a small range. In order to eliminate this inconvenience the fulcrum 66 of the pantograph can slide along a slot in the transverse piece 67, and it may be fixed thereon in any desired point by means of a pressure button or screw. In a similar way the pin 49 may slide along a slot in the bridge 35 of the carriage, and may also be fixed thereon in any desired point by a pressure button or screw.

With the above described arrangement, when the end 51 of the pantograph takes up a position which it is difficult for the operator to reach, he may loosen the said pressure buttons without moving the carriage 35, bring the end 51 of the pantograph in a convenient working position and then tighten again the pressure buttons or screws. The above described operation can be accomplished by means of simple flexible transmissions (Bowden) and without the necessity of the operator moving from his place. The drawings, instead of being made on the same scale in which the carriage 35 moves, can be executed on different scales with the intermediary of any pantograph.

In order to avoid the continuous rubbing of the small lenses 20 against the plates 16, two additional wire nets may be inserted with a sliding movement in the focal plane of the eye-pieces, and the small lenses may be removed after placing the plates in position. The position of the wire nets of the eye-pieces can be rapidly adjusted on the image of the others, and any error in the optical system of observation is automatically compensated.

In the plate-carrying device (Fig. 1) the guides 11, 12, 13, 14 slide in contact with spheres arranged between them, as described above. In order to avoid the possibility of the spheres, of which there are two for each couple of guides, leaving the right position, a small plate with two holes in it (Figs. 14 and 15) serves to keep them at a given distance. In addition, this same plate carries two pulleys 68 on which a steel band 69 is fixed at the point 70 to the guide 11, and at the point 71 to the guide 12. A similar arrangement shown in Fig. 16 ensures the spheres of the spindle inserted in the bar 17 being held in the right position.

What I claim is:

1. Apparatus for obtaining topographic drawings from either aerial or land photographs regardless of the objective employed for obtaining the photographs and adapted to correct the distortion produced by the said objectives without employing an objective identical to that employed in obtaining the photograph, comprising a plate, a carrier for the said plate universally movable in a selected plane, an oscillating bar for moving the said carrier, a universal joint to which the oscillating bar is pivoted at a point determining the point of view, and a spherical joint for correcting the effects of distortion and which connects the said bar to the said carrier.

2. Apparatus for obtaining topographic drawings from either aerial or land photographs regardless of the objective employed for obtaining the photographs and adapted to correct the distortion produced by the said objectives without employing an objective identical to that employed in obtaining the photograph, comprising a plate, a carrier for the said plate universally movable in a selected plane, an oscillating bar for moving the said carrier, a universal joint to which the oscillating bar is pivoted at a point determining the point of view, a spindle slidable within the said oscillating bar, a spherical joint for correcting the effect of distortion, mounted on the said spindle and connecting the said bar to the said carrier, the said spherical joint being comprised of a spherical head on the said spindle and shaped on its outer end to correspond to the distortion of the objective employed to obtain the photograph, and a sphere relatively small in comparison to the spherical head, mounted on the said carrier and on which the said spherical head bears.

3. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a carrier for the said plate universally movable in a selected plane, an oscillating bar for moving the said carrier, a universal joint to which the oscillating bar is pivoted at a point determining the point of view, a spindle slidable in the said oscillating bar, a spherical joint for correcting the effects of distortion carried by the said spindle and connecting the said bar to the said carrier, the said spherical joint being comprised of a spherical head on the said spindle shaped on its outer part to correspond to the distortion of the objective used for obtaining the photograph and which, when employed to rectify convex distortion, is provided with a recess curved in accordance with the said distortion, and a sphere relatively small in comparison with the said spherical head, carried by the said carrier and engaging in said recess.

4. Apparatus for obtaining topographic drawings from either aerial or land photographs regardless of the objective employed for obtaining the photographs and adapted to correct the distortion produced by the said objectives without employing an objective identical to that employed in obtaining the photograph, comprising a plate, a carrier for the said plate universally movable in a selected plane, an oscillating bar for moving the said carrier, a universal joint to which the oscillating bar is pivoted at a point determining the point of view, a spindle slidable in the said oscillating bar, a spherical joint for correcting the effects of distortion carried by the said spindle and connecting the said bar to the said carrier, the said spherical joint being comprised of a spherical head on the said spindle shaped on its outer part to correspond to the distortion of the objective used for obtaining the photograph and which, when employed to correct concave distortion, is provided with additional convex curvature thereon in accordance with said distortion, and a sphere relatively small in comparison with the said spherical head, carried by the said carrier, and bearing on the said additional convex curvature.

5. Apparatus for obtaining topographic drawings from either aerial or land photographs regardless of the objective for obtaining the photographs and adapted to correct the distortions produced by the said objectives without employing an objective identical to that employed in obtaining the photograph, comprising a plate, a carrier for the said plate universally movable in a selected plane, an oscillating bar for moving the said carrier, a universal joint to which the oscillating bar is pivoted at a point determining the point of view, a spindle slidable within the said oscillating bar, a spherical joint for correcting the effect of distortion, mounted on the said spindle and connecting the said bar to the said carrier, the said spindle joint being comprised of a spherical head on the said spindle and shaped on its outer end to correspond to the distortion of the objective employed to obtain the photograph, a sphere relatively small in comparison to the spherical head, mounted on the said carrier and on which the said spherical head bears, and a spring-urged member for retaining contact between the spherical head of the said spindle and the sphere on the carrier.

6. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a plate carrier universally movable in a selected plane, and an oscillating bar for moving the said carrier, a spherical joint for correcting the effect of distortion connecting the said bar to the said carrier, a universal joint, the center of which is movable in relation to the center of the said spherical joint to place the distance between the said two centers in correspondence with the focal distance of the objective employed in obtaining the photograph plate which is being used, and to which universal joint the oscillating bar is pivoted at a point determining the point of view.

7. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a plate carrier universally movable in a selected plane, a plurality of guides for the said carrier, an oscillating bar for moving the said carrier in the said plane, a universal joint to which the said bar is pivoted at a point determining the point of view, a spherical joint for correcting the effects of distortion and which connects the bar to the said carrier, means holding the plate carrier and the said guides, means carrying the said oscillating bar, and means for inclining the said first-mentioned means with respect to the said second-mentioned means to compensate for errors of perpendicular relation between the plane of the photographic plate and the optical axis of the camera employed to take the plate.

8. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a carrier for the said plate universally movable in a selected plane, an oscillating bar for moving the said carrier, a universal joint to which the said bar is pivoted at a point determining the point of view, a spherical joint for correcting the effects of distortion and connecting the said bar to the said carrier, and means carrying the plate carrier and the said bar, the bar being inclinable in orthogonal directions relative to the said means, one of the said directions determining an external orientation of the plate and the other determining the orientation at right-angles to the first-mentioned direction.

9. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a carrier for the said plate universally movable in a selected plane, an oscillating bar for moving the said carrier, a universal joint to which the said bar is pivoted at a point determining the point of view, a spherical joint for correcting the effects of distortion and connecting the said bar to the said carrier, a mounting for the said plate carrier and the said bar, and means for shifting the said carrier and the said bar longitudinally within the said mounting.

10. Apparatus for obtaining topographic drawings from either aerial or land photographs regardless of the objective employed for obtaining the photographs and adapted to correct the distortions produced by the said objectives without employing an objective identical to that employed in obtaining the photograph, comprising a plate, a carrier for the said plate universally movable in a selected plane, an oscillating bar for moving the said carrier, a universal joint to which the said bar is pivoted at a point determining the point of view, a spherical joint for correcting the effects of distortion, and connecting the bar to the carrier, a lens provided with cross lines under which the photographic plate may be moved, a source of light, and a prism for directing light upwardly through the plate to the said lens, a system of prisms, and an ocular system onto which the image from the said plate and lens is projected by the system of prisms.

11. Apparatus for obtaining topographic drawings from either aerial or land photographs regardless of objective employed for obtaining the photographs and adapted to correct the distortions produced by the said objective without employing an objective identical to that employed in obtaining the photograph, comprising two plates, two carriers having cross lines thereon, one for each of the said plates, and each carrier being universally movable in a selected plane, a beam fitted with levels on which the said carriers are carried, oscillating bars for moving the said plates, universal joints to each of which a corresponding bar is pivoted at a point determining the point of view, and spherical joints for correcting the effects of distortion and each connecting a corresponding bar to the corresponding carrier for obtaining stereoscopic observation, the beam being interchangeable from one apparatus to another in order to utilize a continuous series of photographs.

12. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates, universal joints to each of which a corresponding bar is pivoted at a point determining the point of view, spherical joints for correcting the effects of distortion and each connecting a corresponding bar to the corresponding carrier, lens provided with cross lines under which the photographic plates may be moved, sources of light, prisms for directing light upwardly through the plate to the said lens, two systems of prisms, an ocular system onto which the images of the said plates and lenses are projected by the systems of prisms, and means for regulating the distances between the ocular systems according to the pupillary distance of the operator.

13. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plate, universal joints to each of which a corresponding bar is pivoted at a point determining the point of view, spherical joints for correcting the effects of distortion and each connecting a corresponding bar to the corresponding carrier, lens provided with cross lines under which the photographic plates may be moved, sources of light, prisms for directing the light upwardly through the plate to the said lens, two systems of prisms, an ocular system onto which the images of the said plates and lenses are projected by the systems of prisms, means for regulating the distances between the ocular systems according to the pupillary distance of the operator, and means interconnecting the ocular systems and the plate carriers for relative movement therebetween, whereby the ocular systems may be mounted stationary during the stereoscopic observation regardless of the inclination of the plate carriers for reproducing the external orientation of the photographs.

14. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates, universal joints to each of which a corresponding bar is pivoted at a point determining the point of view, spherical joints for correcting the effects of distortion and each connecting a corresponding bar to the corresponding carrier, lens provided with cross lines under which the photographic plates may be moved, sources of light, prisms for directing light upwardly through the plate to the said lens, two systems of prisms, an ocular system onto which the images of the said plates and lenses are projected by the systems of prisms, and means for regulating the distances between the ocular systems according to the pupillary distance of the operator, the said last-mentioned means each comprising a tube in each ocular system, a knee-joint in each of the said tubes, a prism fitted on each of said knee-joints and rotatable through an angle for one half of the angle through which the respective plate carriers rotate, and means whereby the prisms are adapted for radial movement to cause the refracted ray to strike along the center of the reflecting surface of the prism.

15. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates, universal joints to each of which a corresponding bar is pivoted at a point determining the point of view, spherical joints for correcting the effects of distortion, and each connecting a corresponding bar to the corresponding carrier, lens provided with cross lines under which the photographic plates may be moved, sources of light, prisms for directing light upwardly through the plate to the said lens, two systems of prisms, an ocular system onto which the images of the said plates and lenses are projected by the systems of prisms, the said ocular systems having eye-pieces, means for regulating the distances between the ocular systems according to the pupillary distance of the operator, means interconnecting the ocular systems and the plate carriers for relative movement therebetween, whereby the ocular systems may be mounted stationary during the stereoscopic observation regardless of the inclination of the plate carriers for reproducing the external orientation of the photographs, an oscillating objective in each ocular system, which objective is mounted at a fixed distance from the plate regardless of the inclination of the plate carriers, and another objective fixed, one in each of the corresponding eye-pieces.

16. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, and arms to which the bars are connected for tracing on the said carriage.

17. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, and being universally movable in a selected plane, oscillating bars for moving the said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms adjustable angularly and linearly attached to the said carriage, and to the said bars whereby the said bars produce tracing movement of the said carriage, the adjustability of the arm providing for increased range for the reconstruction of the model.

18. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates respectively, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms connecting said bars with the said tracing carriage, and rings pivotally connected by universal joints to a respective arm, and through which ring the corresponding bar passes.

19. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for moving the said plates respectively, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms connecting said bars with the said tracing carriage, rings pivotally connected by universal joints to the corresponding arm, and through which ring the corresponding bar passes, and a micrometer screw for each ring, by means of one of which screw, the corresponding ring may be shifted in one direction, and by means of the other screw, the other ring may be shifted perpendicularly to the said last-mentioned direction.

20. Apparatus for obtaining topographic drawing from either aerial or land photographs regardless of the objective employed for obtaining the photographs and adapted to correct the distortions produced by the said objective without employing an objective identical to that employed in obtaining the photographs, comprising two plates, two carriers, one for each of the said plates, each being universally movable in a selected plane, oscillating bars for respectively moving the said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms on the carriage to which the bars are connected for effecting tracing movement of the said carriage, means for shifting the tracing carriage in a substantially vertical direction comprising a micrometer screw, a graduated head on the said micrometer screw, and a hand wheel and gearing for controlling the said screw, the graduation indicating the quota of points collimated on the two plates.

21. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for respectively moving the said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms on the carriage to which the bars are connected for effecting tracing movement of the said carriage, a hand wheel for moving the carriage in a vertical direction, and a pantograph controlling the tracing carriage in a horizontal direction, the said pantograph being movable by one hand of the operator, who with the other hand moves the hand wheel.

22. Apparatus for obtaining topographic drawings from either aerial or land photographs regardless of the objective employed for obtaining the photographs and adapted to correct the distortions produced by the said objective without employing an objective identical to that employed in obtaining the photograph, comprising two plates, two carriers, one for each of the said plates, each being universally movable in a selected plane, oscillating bars for respectively moving the said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms on the carriage to which the bars are connected for effecting tracing movement of the said carriage, a pantograph controlling the tracing carriage in a horizontal direction, and a pencil carried by the said pantograph for executing planimetric drawings as an incident to the movement caused by the operator.

23. Apparatus for obtaining topographic drawings from either aerial or land photographs regardless of the objective employed for obtaining the photographs and adapted to correct the distortion produced by the said objective without employing an objective identical to that employed in obtaining the photograph, comprising two plates, two carriers, one for each of the said plates, each being universally movable in a selected plane, oscillating bars for respectively moving said plates, universal joints to each of which a corresponding bar is pivoted at a point determining the point of view, spherical joints for correcting the effects of distortion, and each connecting a corresponding bar to the corresponding carrier, for obtaining stereoscopic observation, a tracing carriage, arms on the carriage to which the bars are connected for effecting tracing movement of the said carriage, a hand wheel for moving the carriage in a vertical direction, and a pantograph controlling the tracing carriage in a horizontal direction, the said pantograph being movable by one hand of the operator, who with the other hand moves the hand wheel, fulcrum pins and orthogonal guides for the said pantograph, movement of the pantograph along the said guides being occasioned by loosening the pins and subsequently shifting the pantograph, whereby a complete course of the tracing carriage is obtained with any desired ratio and within the operating range of the arm of the operator.

ERMENEGILDO SANTONI.